United States Patent [19]
Sasaki

[11] 3,882,829
[45] May 13, 1975

[54] FUEL INJECTION CONTROL DEVICE
[76] Inventor: Takeo Sasaki, 840 Chiyoda-cho, Himeji, Hyogo, Japan
[22] Filed: Sept. 13, 1972
[21] Appl. No.: 288,760

Related U.S. Application Data
[63] Continuation-in-part of Ser. No. 78,111, Oct. 5, 1970.

[30] Foreign Application Priority Data
Oct. 8, 1969  Japan.............................. 44-80572

[52] U.S. Cl........................... 123/32 EA; 123/119 R
[51] Int. Cl............................................... F02d 5/04
[58] Field of Search........ 123/32 EA, 32 AE, 119 R

[56] References Cited
UNITED STATES PATENTS
2,867,200  1/1959  Gryder et al. .................. 123/32 EA
3,522,794  8/1970  Reichardt........................ 123/32 EA
3,587,536  6/1971  Inoue............................... 123/32 EA
3,727,592  4/1973  Wilkinson........................ 123/32 EA Primary Examiner—Laurence M. Goodridge
Assistant Examiner—Cort Flint
Attorney, Agent, or Firm—Robert E. Burns; Emmanuel J. Lobato; Bruce L. Adams

[57] ABSTRACT

A fuel injection control device comprising pluralities of second pulse generators in addition to a first pulse generator between a pulse distributor and respective fuel injection valves. The second pulse signal is added to the first pulse signal to produce a sum signal thereof, and the pulse width of each pulse is controlled by a single pulse width control circuit common to the respective fuel injection valves, thereby to control each of the injection valves to actuate for a period of time properly determined depending upon the operational state of the engine. Each of the injection valves can operate continuously and the injection period of one fuel injection valve can overlap that of a following fuel injection valve.

5 Claims, 6 Drawing Figures

3,882,829

FUEL INJECTION CONTROL DEVICE

This is a continuation-in-part of my application Ser. No. 78,111 filed Oct. 5, 1970.

BACKGROUND OF THE INVENTION

1. Field of the Invention

This invention relates generally to fuel injection control devices for use in internal combustion engines, and more particularly to a fuel injection control device capable of electrically controlling the actuating period of the fuel injection valves in accordance with the operation state in which the engine is driven.

2. Description of the Prior Art

One example of a conventional fuel injection control devices of the type the invention concerns is disclosed in W. Reichardt's U.S. Pat. No. 3,522,794 entitled "Electronically Controlled Injection System for an Internal Combustion Engine." According to this patent, the injection time of one fuel injection may be made to overlap the injection time of a following fuel injector even though only one multivibrator is used to control the beginning of all sequentially operated injectors. This is accomplished by causing electrical charge storage means to charge during the time the multivibrator is in the unstable state, during which time current flows through the activation coil of the fuel injector. This storage means discharges through the activation coil of the same injector when the control multivibrator changes state, thus causing current to continue to flow through the activation coil, thus in turn causing fuel to continue being injected by the injector.

According to the circuit arrangement of the cited patent, it is also possible to operate the fuel injectors continuously by the provision of a control circuit for each of the fuel injectors. With this circuit arrangement, however, a deviation often appears among each of the fuel injection periods due to the deviation of the elements forming the control circuits as well as to the deviation in characteristics of the various detectors provided for detecting the operation state of the engine, and it is almost impossible to restrain the resulting deviation so that it is small with respect to every state of the various kinds of detectors. Moreover, the valve control device will inevitably become expensive because of the provision of pluralities of the control circuits.

In order to eliminate the above-described disadvantages of the control device, there has also been proposed a fuel injection control device comprising one injection period determining circuit for pluralities of output transistors each of which is adapted to operate a group of fuel injection valves. Each of the valve groups is composed of at least one fuel injection valve. This arrangement of the fuel injection valves depends upon the experimental fact that the fuel injection period is not influenced at the time of fuel injection into the suction manifold of the engine.

With this type of the fuel injection control device, however, separate groups of fuel injection valves cannot perform the injection operations at the same time. Besides, the maximum injection periods realizable by the respective fuel injection valves are inevitably restricted in accordance with the number of rotation of the engine.

SUMMARY OF THE INVENTION

Accordingly, it is an object of the invention to provide a fuel injection control device capable of electrically controlling the actuating period of the fuel injection valves in accordance with the operation state of the engine, whereby each of the injection valves can operate continuously and the injection period of one fuel injection valve can overlap that of a following fuel injection valve.

According to the present invention there is provided a fuel injection control device for use in internal combustion engines comprising a plurality of valve means each having at least one fuel injection valve, a first pulse generator for generating a first pulse signal for controlling in succession said valve means in response to a predetermined rotational angle of the engine, a plurality of second pulse generators for generating a second pulse signal, each pulse of said second pulse signal being supplied to each of said plurality of valve means, means for controlling in common the pulse widths of each pulse of said second pulse signal, and means for controlling the actuating timing of each of said valve means in response to a sum signal of said first and second pulse signals.

BRIEF DESCRIPTION OF THE DRAWING

The invention will become more readily apparent from the following detailed description taken in conjunction with the accompanying drawing in which.

Throughout the several Figures the same reference numerals designate the identical or corresponding components.

DESCRIPTION OF THE INVENTION

Figure 1:
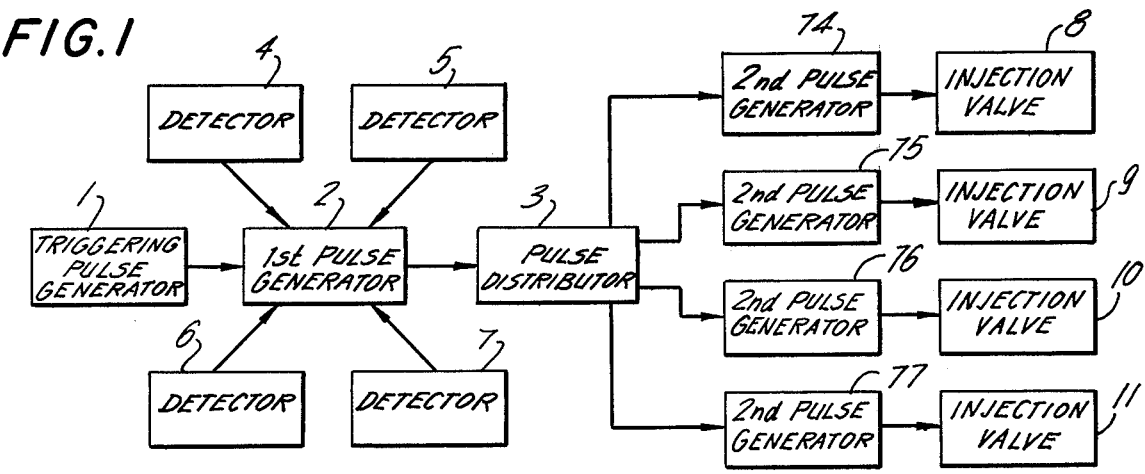
FIG. 1 is a block diagram for explaining the principles of the present invention.

Referring now to FIG. 1 of the drawings, wherein the principles of the present invention are illustrated as being applied to a four cylinder internal combustion engine, it is seen that a triggering pulse generator circuit 1 for generating a triggering pulse at each of predetermined rotational angles of the engine is connected through a first pulse generator circuit 2, such as a monostable multivibrator circuit to a pulse distributor circuit 3. It is also seen that the device comprises a plurality of detectors 4, 5, 6 and 7 which are, for example, an intake pressure detector, an accelerator opening degree detector, a suction air temperature detector and an engine temperature detector respectively. These detectors, 4 to 7, detect the various operation states in which the engine is driven to control the pulse widths of the pulses supplied from the monostable multivibrator circuit 2.

Fuel injection valves 8, 9, 10 and 11 each associated with the respective cylinders of the engine are supplied the divided pulse signals from the pulse distributor 3 through respective four second pulse generators 74, 75, 76 and 77 respectively.

The operation of the control device shown in FIG. 1 will now be described: The triggering pulse generator 1 generates a series of triggering pulses to operate the monostable multivibrator circuit 2. The monostable multivibrator circuit 2 delivers a series of pulses having a pulse width determined in accordance with the output signals from the various detectors 4 to 7. The output pulses from the monostable multivibrator circuit 2 are supplied to the pulse distributor circuit 3 to be distributed toward each of the fuel injection valves 8 to 11 through the respective second pulse generator circuits 74 to 77. The second pulse generators 74 to 77 amplify the output pulses from the pulse distributor circuit 3 in accordance with the operation state of the engine, for example, with the temperature of the engine. Thus the fuel injection valves 8 to 11 are operated to inject the fuel into the intake pipe of the engine by the action of an electromagnet associated therewith.

Comparing the device of the present invention illustrated in FIG. 1 with the prior art devices as previously described, it is easily understood that the device of the invention additionally comprises a plurality of second pulse generators 74 to 77 at the output terminals of the pulse distributor 3. This additional provision of the second pulse generators enables the fuel injection valves to operate at the same time. In other words, one of the fuel injection valves can initiate injection operation before the other fuel injection valve terminates its injection operation. In addition, by suitably selecting the circuit constant of the second pulse generators 74 to 77, each of the fuel injection valves 8 to 11 can perform continuous fuel injection.

Figure 2:
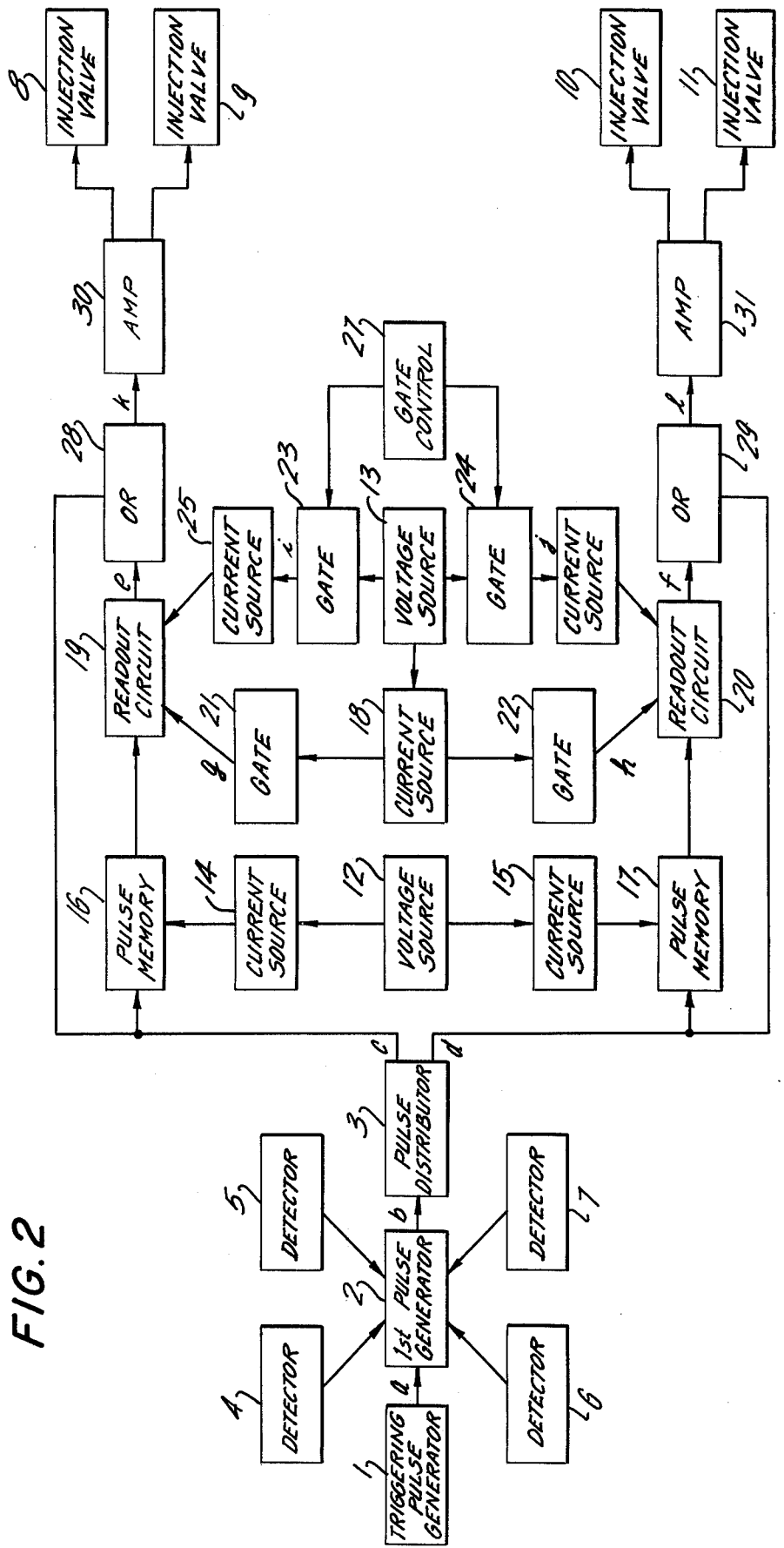
FIG. 2 is a block diagram illustrating one embodiment of the invention.

FIG. 2 shows one embodiment of the invention wherein the injection valves are grouped in pairs and operated by the respective common signals. Some of the components illustrated in FIG. 2 are quite identical to those shown in FIG. 1, and therefore, the description will be made only in terms of newly appearing components.

The illustrated control device comprises voltage sources 12 and 13. The voltage source 12 is connected through respective current sources 14 and 15 to pulse memories 16 and 17, while the voltage source 13 is connected at one of its outputs to a current source 18 which is, in turn, connected to pulse readout circuits 19 and 20 through gate circuits 21 and 22 such as diodes. Other output terminals of the voltage source circuit 13 are also connected to the pulse readout circuits 19 and 20 through voltage transmitting gate circuits 23 and 24 and current sources 25 and 26 respectively. To control the voltage transmitting gate circuits 23 and 24, a gate control circuit 27 is connected thereto. The output terminal of the pulse memory 16 is connected to the pulse readout circuit 19 which provides an output to an OR circuit 28. Similarly, the pulse memory 17 is connected to an OR circuit 29 through the readout circuit 20.

On the other hand, the outputs from the pulse distributor 3 are directly supplied to the OR circuits 28 and 29. The outputs from the OR circuits 28 and 29 are sum signals of the output from the pulse readout circuit 19 and one of the outputs from the pulse distributor circuit 3 and the output from the pulse readout circuit 20 and the other output from the pulse distributor circuit 3 respectively. The output pulse signals from the OR circuits 28 and 29 are supplied to the grouped fuel injection valves 8 and 9 and the other grouped valves 10 and 11 through amplifiers 30 and 31 respectively.

The fuel injected from the injection valves 8 to 11 into the suction manifold is then supplied therefrom through the suction valve into the combustion chamber of the engine. The suction valve closes during the firing stroke, and therefore the fuel supplied during this period is not introduced into the combustion chamber and is accumulated in the suction manifold. Thus during the continuous fuel injection period, the accumulated fuel is immediately introduced into the combustion chamber when the suction valve opens, ensuring that the fuel supply is always sufficient; from low load condition to high speed, heavy load condition.

The operation of the fuel injection control device shown in FIG. 2 will now be described in conjunction with FIG. 3 in which waveforms of signals at several points of the block diagram of FIG. 2 are illustrated.

Figure 3:
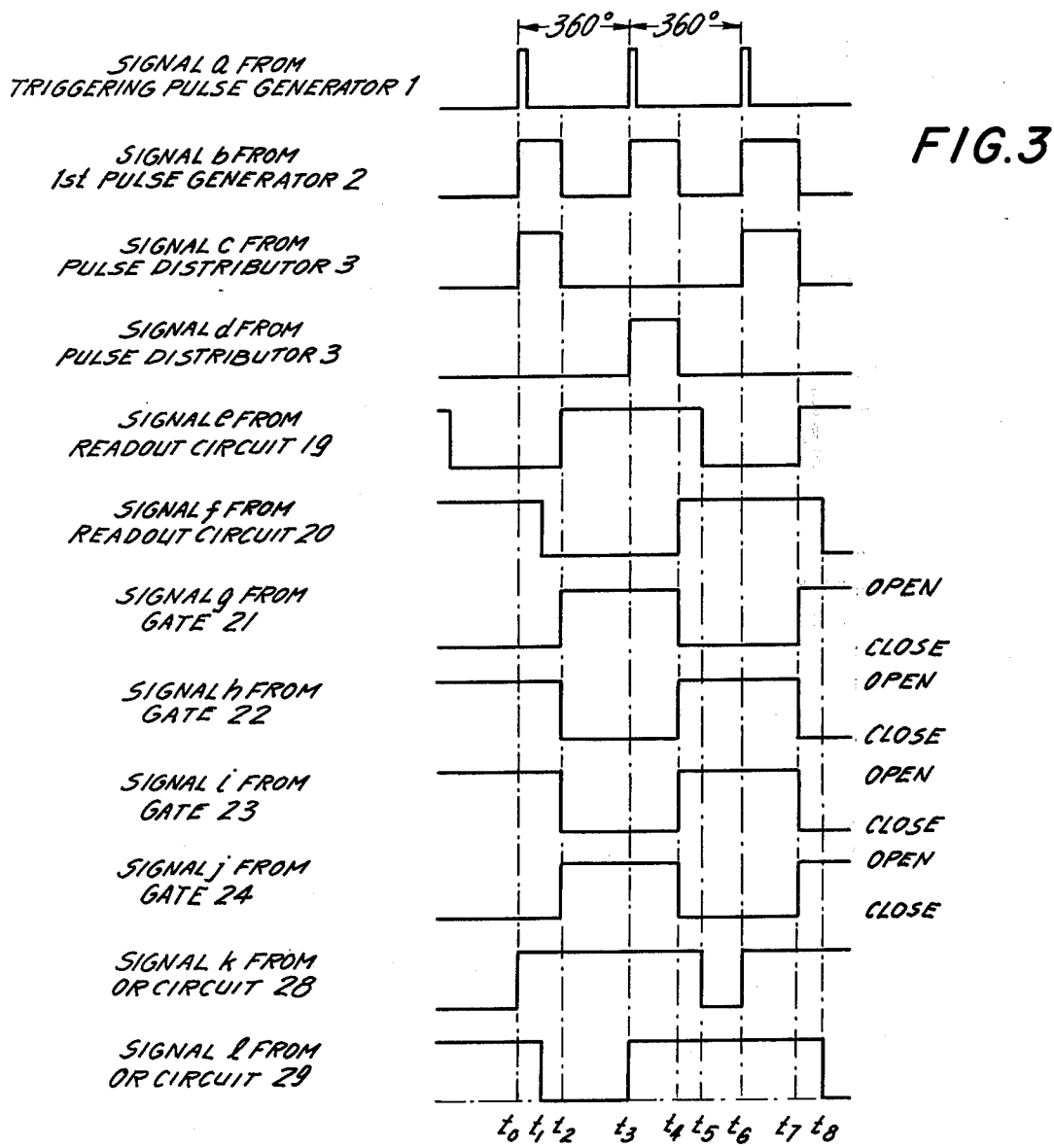
FIG. 3 is waveform diagram illustrating waveforms at various points of the block diagram shown in FIG. 2.

The triggering pulse generator circuit 1 generates a train of triggering pulses 2 shown in FIG. 3. Each of the pulses is produced at a predetermined rotational angle of the engine, in this embodiment, at every 360°. The signal $a$ from the triggering pulse generator 1 triggers the first pulse generator 2 which is composed of a monostable multivibrator circuit to provide an output signal $b$ as shown in FIG. 3. The first pulse generator circuit 2 is controlled in the period during which the circuit is brought in the metastable state depending upon the output signals from the various detectors 4 to 7 which detect the various operation states in which the engine is driven. These detectors may be an intake pressure detector, an accelerator opening degree detector, a suction air temperature detector and an engine temperature detector.

The pulse signal $b$ is divided by the pulse distributor 3 into two pulse signals $c$ and $d$ having waveforms as shown in FIG. 3 and each of them is to be supplied to the respective fuel injection groups 8 and 9, and 10 and 11. One of the divided pulse signals, for example pulse signal $c$ charges a capacitor involved in the pulse memory circuit 16 during time intervals $t_0-t_2$ and $t_6-t_7$ to store the pulse width in the form of an electric charge. Similarly, the signal $d$ charges a capacitor of the pulse memory circuit 17 through the use of the current from the current source 15 during a time interval $t_3-t_4$. It is to be noted that the two current sources 14 and 15 are adapted to be operated by the single common voltage source 12.

The pulse to be stored in the pulse memory circuit 16 terminates at a time point $t_2$ (see FIG. 3, signal $c$) and the pulse width storing operation is completed at this time point. At the same time, as will be apparent later, the gate circuit 21 is brought into its open state (FIG. 3, waveform $g$) to discharge the capacitor of the pulse memory circuit 16 which has been previously charged by the current valve of the current source 14. The initiation of discharging causes the pulse readout circuit 19 to begin to generate a pulse as shown by a signal $e$ at its output terminal and continues to generate the pulse until the electric charge stored in the capacitor of the memory circuit 16 has been lost as shown in FIG. 3, signal $e$. However, the capacitor of the pulse memory circuit 17 completes the charging at the time point $t_4$ which lags by an angle of 360° as measured by the rotational angle of the engine. Then the gate circuit 22 is brought into open state (FIG. 3, signal $h$) to initiate discharging of the capacitor by the current valve of the current source 18. However, since the gate circuit 21 is brought into a closed state simultaneously with the opening of the gate circuit 22, the discharging of the capacitor which has been continued up to this time point terminates. In order to prevent this discontinuity of discharging, another current source 25 is provided. The current source 25 causes the voltage transmitting gate circuit 23 to be brought in to an open state in response to a command signal from the gate control circuit 27. Therefore, the voltage from the voltage source 13 is transmitted to the current source 25 to operate the same. The operation of the current source 25 causes the pulse readout operation to continue. In short, the pulse readout circuit 19 generates a second pulse signal $e$. The second pulse signal $e$ delivered from the readout circuit 19 is added to the first pulse signal $c$ supplied from the pulse distributor 7 by the OR circuit 28 to provide an output signal $k$. The signal $k$ from the OR circuit 28 issupplied to the fuel injection valves 8 and 9 after it has been amplified through the amplifier 30. Thus the fuel is injected by each of the injection valves 8 and 9 into the suction manifold of the engine.

As previously described, the fuel injection period of each of the injection valve groups 8 – 9 and 10 – 11 is determined in accordance with the signal $k$ supplied from the OR circuit 28 or the signal $l$ supplied from the OR circuit 29. Therefore, from FIG. 3, waveforms $k$ and $l$, it is easily understood that the fuel injection periods for the injection valves can overlap one another for periods of time $t_0 - t_1$, $t_3 - t_5$, $t_6 - t_8$, and so on. This is one of the great advantages of the present invention.

On the other hand, since the duration of the signal $k$ is the sum value of the pulse widths of the signal $c$ and the signal $e$ which can extend for a substantially unlimited period in accordance with the operation state of the engine, the fuel injection valve can perform the continuous injection operation which has been impossible by the conventional control device. This is another great advantage of the present invention.

It will be easily understood that a quite identical operation is accomplished in terms of the fuel injection valves 10 and 11 by the components shown in the lower part of FIG. 2.

For a more accurate control of the fuel injection valves, the voltage source 13 is preferably provided with several detector elements for detecting the operational state of the engine, such as a detector for detecting the temperature of the engine or the like, thereby to vary the voltage value thereof in accordance with the temperature of the engine.

Figure 4:
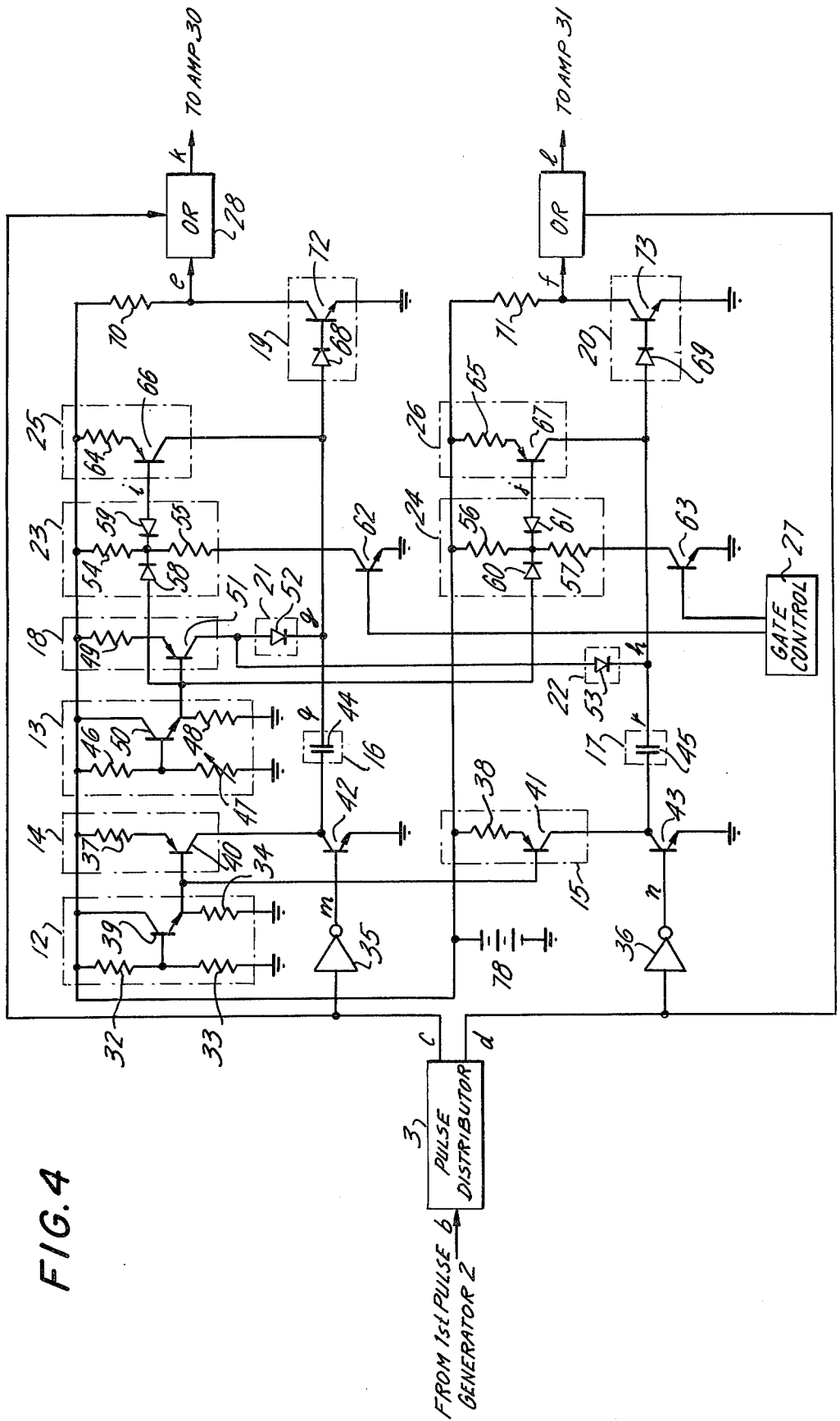
FIG. 4 is an electric circuit diagram of the device shown in FIG. 2.

FIG. 4 illustrates a circuit diagram of one portion of the control device shown in FIG. 2. It is seen that the control devide comprises inverters 35 and 36 connected respectively to the respective bases of switching NPN transistors 42 and 43. The collector of the transistor 42 is connected to a capacitor 44 which composes the pulse memory circuit 16 shown in FIG. 2. The current sources 14, 18 and 25 comprise PNP transistors 40, 51 and 66 respectively. Each of the gate circuits 21 and 22 is composed of a diode 52 or 53 having a gating function. Diodes 58 and 59 resistors 54 and 55 form the voltage transmitting gate circuit 23 shown in FIG. 2.

The gate circuit 23 is connected to a transistor 62 for controlling the same. A diode 68 and a transistor 72 form the readout circuit 19 providing the second pulse output from the collector of the transistor 72. A battery 78 is connected in common to the voltage sources 12 and 13, the current sources 14, 18 and 25, and the gate control circuit 23.

It is understood that the lower portion of the circuit is similar to the upper portion of the circuit that has just been described.

The operation of the circuit diagram shown in FIG. 4 will now be described in conjunction with FIG. 5 which shows several waveforms of the signals at various points of the circuit diagram of FIG. 4. The description will be made only in terms of the upper portion of the circuit because the lower portion of the circuit has a similar circuit arrangement.

The pulse distributor circuit 3 provides the first pulse signals $c$ and $d$ as has been previously described in conjunction with FIGS. 2 and 3. The first pulse signal $c$ is inverted in polarity by the inverter 35 to become a pulse signal $m$ shown in FIG. 5. The transistor 42 switches to its OFF state only when the inverted pulses of the signal $m$ are applied thereto from the inverter 35, whereby the capacitor 44 is gradually charged as shown in the waveform $o$ of FIG. 5 due to the constant current from the transistor 40. Therefore, the electric potential at the collector of the transistor 42 is gradually increased. As a result, the pulse width of the first pulse is stored in the capacitor 44 in the form of the amount of the electric charge charged during the periods $t_0-t_2$ and $t_6-t_7$ or in the form of the electric potential. This electric potential appears at the anode electrode of the diode 68 as a negative polarity as soon as the pulse of the first pulse signal has been terminated i.e., at the time point $t_2$ to $t_7$. This is because, at that instant, the transistor 42 is brought into its ON state leading to a rapid decrease in the collector electric potential as low as substantially ground potential. Therefore, the transistor 72 which has been in its ON state is brought into its OFF state to provide a positive pulse signal $e$ at its collector. As a result, the electric charge in the capacitor 44 discharges due to the presence of the constant current from the current source 18 or the transistor 51. Thus the discharging of the capacitor 44 continues as shown in FIG. 5, waveform $q$. It is to be noted that the diodes 52 and 53 are in the ON and OFF states respectively during this charging operation of the capacitor 44.

When the waveform $n$ appears at the output of the inverter 36 with the time lag of the rotational angle of 360° of the engine, a similar phenomenon is also seen in the transistor 43 and the capacitor 45. As a result, the electric potential of the anode of the diode 69 is reduced with the time lag of an angle of 360°, whereby the transistor 73 is brought into its OFF state and generates at its collector the pulse signal $f$ as shown in FIG. 5. At this same time, the diode 53 is brought into its ON state to initiate the discharging of the capacitor 45. Therefore, the diode 52 is forced to be in the OFF state. This results in the stoppage of the discharging operation of the capacitor 45 if the transistor 72 remains in its OFF state.

To prevent this stoppage of the discharging operation of the capacitor 45, the PNP transistor 66 is additionally provided. The transistor 66 is controlled by the gate control transistor 62 such that the voltage transmitting gate circuit 23 which is composed of the diodes 58 and 59, and the resistors 54 and 55 is brought in its open state when the transistor 62 is in the ON state. This enables the constant current source 25 composed of the transistor 66 to be brought into its operable state whereby the discharging operation of the capacitor 44 is continuously achieved.

As understood from the foregoing description, the pulse width of the second pulse signal $e$ supplied from the transistor 72 is proportional to the pulse width of the first pulse signal supplied from the first pulse generator circuit 2 under the condition that the voltage value of the voltage source 13 of the transistor 50 is constant. The proportional constant thereof is determined according to the current value of the constant current value for charging and discharging. Since there is provided the variable resistor 47 such as a temperature sensing resistor element variable in accordance with the engine temperature, the voltage value of the transistor 50 can be varied in response to the temperature of the engine. Therefore, the current value of the constant current source 18 becomes variable in intensity thereby to enable the proportional constant to be varied. It is to be noted that, in this case, since the voltage source 13 of the transistor 50 is arranged to control the constant current sources 66 and 67 which are disposed separate from the common constant current source 51, the discharging can be performed continuously even when the switching operation has been done from the current source 51 to the other current source 66 or 67.

The second pulse signal $e$ from the transistor 72 is added by the OR circuit 28 to the first pulse signal $c$ to provide a sum signal $k$ having a pulse width composed of two pulse signals $c$ and $e$. The sum pulse signal $k$ is supplied to the respective fuel injection valves 8 and 9 after it has been amplified by the amplifier 30.

The fuel injection valves 10 and 11 receive pulse signal $l$ which is a sum signal of the first pulse signal $d$ and the second pulse signal $f$ in the same manner as above described.

The fuel injection valve of the present invention can perform a continuous fuel injection operation, ensuring that the fuel supply can accurately be controlled and that the sufficient fuel issupplied into the combustion chamber over a wide range of operational states of the engine.

More specifically, in FIG. 4, when the operational state of the engine has changed and a greater quantity of fuel is required due to high speed and heavy load running conditions, the pulse width of each of the pulses from the first pulse generator 2 increases. This results in an increase in amount of electric charge or an elongation in charging period. Therefore, the discharge periods of the capacitors 44 and 45, which begin when the transistors 42 and 43 turn on after the termination of the charging on the capacitors 44 and 45, become long. As a result, the discharge period for a signal terminates only after the charging operation due to the subsequent pulse begins, superimposing, in part, one upon another.

Figure 6:
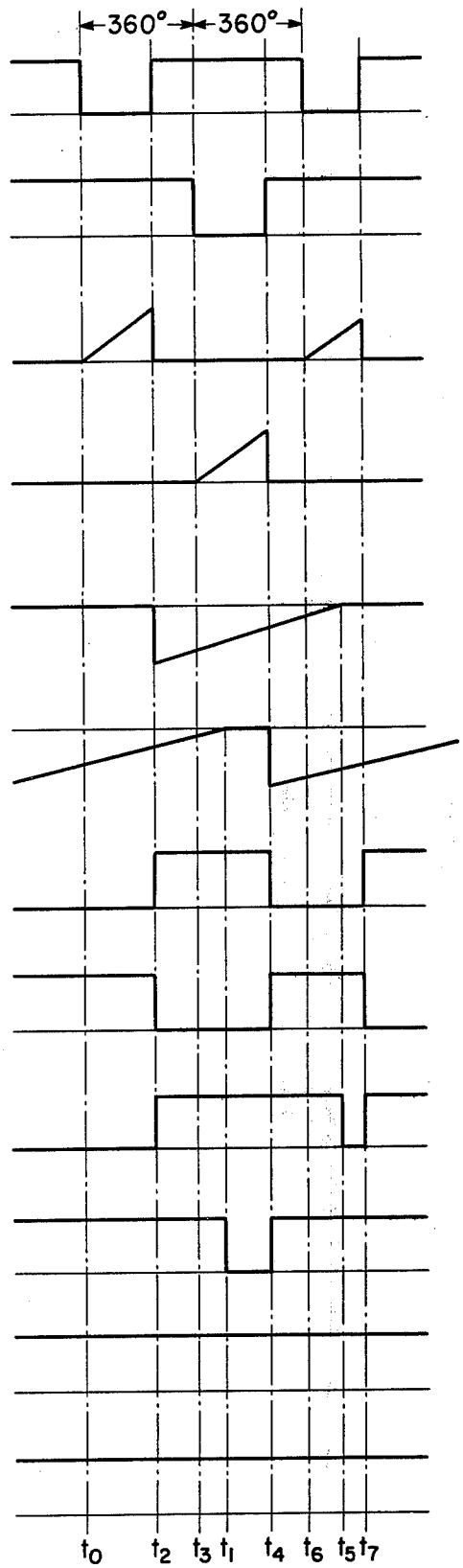
FIG. 6 is a diagram illustrating waveforms similar to those of FIG. 5, but under continuous injection operation.

In FIG. 6, wherein the waveforms at various circuit points as those in FIG. 4 are illustrated, when the first pulse increases in pulse width because of the change in the operational state of the engine, such as an increase in load and speed, the negative pulse from the inverter 35 becomes as shown in waveform $m'$ in FIG. 6 which has a pulse width of from $t_0$ to $t_2$. The capacitor 44 is charged during this time period of from $t_0$ to $t_2$ and at the time point $t_2$, the electric charge stored on the capacitor 44 begins to discharge due to the conduction of the transistor 42. This discharge operation of the capacitor 44 terminates at $t_5$ as seen from waveform $q'$.

Figure 5:
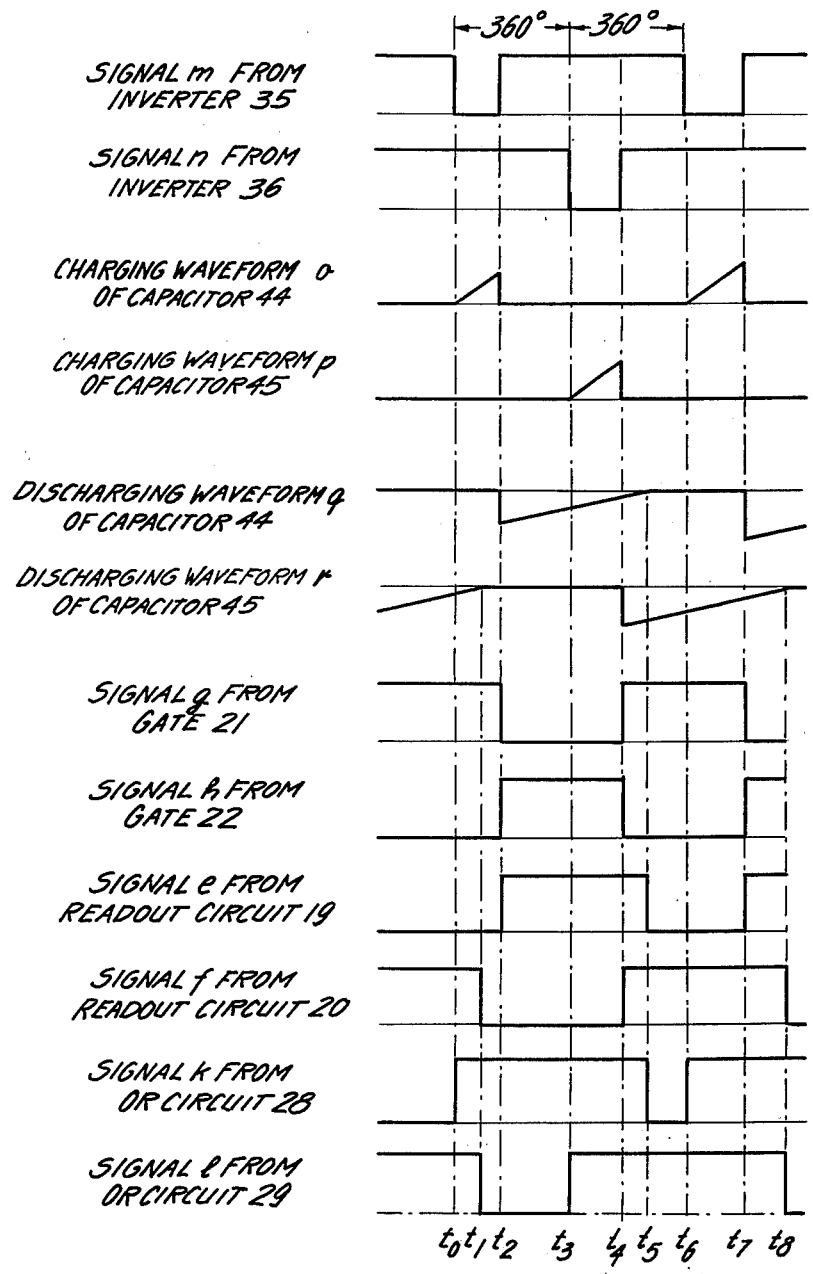
FIG. 5 is a diagram of waveforms at various points of the circuit diagram shown in FIG. 4.

It should be noted that in this case shown in FIG. 6, the discharge time period of the capacitor 44 is longer than that in the normal operation shown in FIG. 5. Therefore, before the capacitor 44 terminates its discharge operation, the subsequent charging operation due to the subsequent pulse begins and they are superimposed in part with one another, for example, between the time points $t_6$ and $t_5$ in FIG. 6. Therefore the signals $k'$ and $l'$ which are the sum signals of the signals $c'$ and $e'$ and the signals $d'$ and $f'$ respectively, become continuous as illustrated in waveforms $k'$ and $l'$. Since these continuous constant signals $k'$ and $l'$ are supplied to the injection valves and control the actuation of the fuel injection valves, the operation of the fuel injection valves is continuous. As previously described, since the fuel supplied by means of any suitable pump, for example, from the fuel injection valves is injected into the suction manifold, which is disposed in front of the suction valve, the fuel supply to the combustion chamber is controlled by the open and close operation of the suction valve.

From the foregoing it will be appreciated that the control device of the invention comprises the first pulse generator circuit for producing the pulse for each of the groups of fuel injection valves and the pluralities of the second pulse generator circuits for producing separate pulses toward the respective groups of the fuel injection valves, the second pulse generator circuits being arranged such that their current sources for pulse storing and readout operations is controlled by a single voltage source. Therefore, the device is reduced in error between the respective second pulses and the control of the device can be easily achieved. In addition, since the memory means are reversibly used in common both for the storing and readout operations, the control device is extremely stable against the deviation of the memory means and the variation of the various values of the elements due to the variation of the temperature.

It is to be noted, however, that the most appreciable advantage of the invention is obtained depending upon the fact that the fuel injection period of each of the fuel injection valves is variable at will up to the continuous injection. That is, since the degree of freedom of the fuel injection period increases, the control thereof can be easily achieved. Besides, the fuel injection control device can be also applicable to the engines that have various cylinder volumes by effecting a slight change in control unit with the fuel injection valves which are difficult to be machined grouped in some groups.

Although the invention has been described in terms of the device in which the voltage source 13 varies according to the temperature of the engine alone, the voltage source 13 may be varied in accordance with the rotational number of the engine, suction air temperature, suction air pressure, degree of acceleration and/or degree of deceleration. This will provide a more preferable control device for the fuel injection valves.

In addition, although the invention has been described in terms of the fuel injection control device for use in four cylinder internal combustion engines and particularly in engines having two injection valve groups, it is to be understood that the invention is also applicable to an engine in which the fuel injection valves are grouped in three groups by just providing an additional current source and gate circuit.

What we claim is:

1. A fuel injection control device for use in internal combustion engines comprising a plurality of valve means each having at least one fuel injection valve connected to an internal combustion engine, triggering pulse generator means for generating triggering pulses in response to a predetermined rotational angle of the engine, first pulse generator means for generating a train of first pulse signals wherein each said first pulse signal is produced in response to each of said triggering pulses, dividing means connected to said first pulse generator means and having a plurality of outputs for dividing pulses of said first pulse signals successively between said plurality of outputs, a plurality of second pulse generators each having an input connected to a respective one of said dividing means outputs for generating respective second pulse signals responsive to the divided train of first pulse signals, means for controlling in common the pulse widths of said second pulse signals, and a plurality of combining means each connected to a respective one of said dividing means outputs and a respective one of said second pulse generators for producing a sum signal of said first and second pulse signals, each said combining means having an output connected to a respective one of said valve means for controlling the actuating period of each of said valve means, whereby each of said valve means is capable of actuating independently of the other of said valve means, continuously for periods greater than 720° of engine rotation and the injection period of one of the valve means is capable of overlapping that of another said valve means independently of said another said valve means.

2. A fuel injection control device as claimed in claim 1, wherein each of said second pulse generators includes a first semiconductor switching element having a control electrode, and an inverter connected between said control electrode and a respective one of said dividing means outputs.

3. A fuel injection control device as claimed in claim 1, wherein each of said means for controlling in common the pulse widths of said second pulse signals comprises a single constant current source connected to each of said second pulse generators.

4. A fuel injection control device as claimed in claim 1, wherein each of said second pulse generators includes a first semiconductor switching element having an output electrode, and having a control electrode coupled to a respective one of said dividing means outputs, a charging and discharging element connected to said output electrode of said first semiconductor switching element, and a second semiconductor switching element having an input electrode connected to said charging and discharging element, and having an output electrode coupled to a respective one of said combining means.

5. A fuel injection control device as claimed in claim 1, wherein each said second pulse signal generator includes means for initiating its said second pulse signal upon the termination of a respective divided first pulse signal applied thereto, and means for controlling the pulse width of its said pulse in proportion to a variable operation state of the engine.

* * * * *